(12) United States Patent
Oda et al.

(10) Patent No.: US 12,458,009 B2
(45) Date of Patent: Nov. 4, 2025

(54) FISHING CONDITION DETECTION AND TRANSMISSION DEVICE

(71) Applicant: GLOBERIDE, Inc., Tokyo (JP)

(72) Inventors: Takuya Oda, Tokyo (JP); Yukihisa Miya, Tokyo (JP)

(73) Assignee: GLOBERIDE, INC., Tokyo (JP)

( * ) Notice: Subject to any disclaimer, the term of this patent is extended or adjusted under 35 U.S.C. 154(b) by 110 days.

(21) Appl. No.: 18/249,696

(22) PCT Filed: Sep. 14, 2021

(86) PCT No.: PCT/JP2021/033642
§ 371 (c)(1),
(2) Date: Apr. 19, 2023

(87) PCT Pub. No.: WO2022/091610
PCT Pub. Date: May 5, 2022

(65) Prior Publication Data
US 2023/0404051 A1 Dec. 21, 2023

(30) Foreign Application Priority Data

Oct. 27, 2020 (JP) .................................. 2020-179325

(51) Int. Cl.
*A01K 97/12* (2006.01)
(52) U.S. Cl.
CPC .................................. *A01K 97/125* (2013.01)
(58) Field of Classification Search
CPC .. A01K 97/125; A01K 93/02; A01K 89/0155; A01K 89/0165; A01K 89/017; A01K 89/0182

(Continued)

(56) References Cited

U.S. PATENT DOCUMENTS 4,644,680 A 2/1987 Dawson
4,969,285 A * 11/1990 Ellsworth .............. A01K 97/10
43/17

(Continued)

FOREIGN PATENT DOCUMENTS

EP 2060176 A1 5/2009
JP S62-094780 U 6/1987

(Continued)

OTHER PUBLICATIONS

Dec. 12, 2023 Office Action Issued in Japanese Patent Application No. 2020-179325.

(Continued)

*Primary Examiner* — Zoe Tam Tran
(74) *Attorney, Agent, or Firm* — Oliff PLC (57) ABSTRACT

To provide a fishing state detection/transmission device that is capable of being provided on a fishing rod, detecting the above-described fishing state accurately and reliably, and transmitting the fishing state to the fishing person. There is provided a fishing state detection/transmission device according to an embodiment of the disclosure that comprises a grip portion and is provided on a fishing rod to which a fishing line having a fishing hook is attached at an end, the fishing state detection/transmission device comprising: a vibration generation unit that is provided on the grip portion and generates vibration in the grip portion; a first detection unit that is provided on the fishing rod and detects movement or vibration of the fishing rod to generate first time-series data; and an information processing unit that transmits a vibration generation signal to the vibration generation unit on a basis of the first time-series data.

13 Claims, 9 Drawing Sheets

(58) Field of Classification Search
USPC .................. 43/17, 16, 26.1, 21; 242/305
See application file for complete search history.

(56) References Cited

U.S. PATENT DOCUMENTS

| | | | | |
|---|---|---|---|---|
| 5,581,930 | A * | 12/1996 | Langer | A01K 97/00 43/17 |
| 6,220,538 | B1 * | 4/2001 | Durso | A01K 91/065 43/17 |
| 7,140,144 | B1 * | 11/2006 | Morgan | A01K 97/12 43/16 |
| 7,810,274 | B2 * | 10/2010 | Burns, III | A01K 87/00 43/18.1 R |
| 10,478,727 | B2 * | 11/2019 | Blackadar | A63F 13/46 |
| 2003/0089020 | A1 * | 5/2003 | Dirito | A01K 97/125 43/17 |
| 2005/0259515 | A1 * | 11/2005 | Maesawa | A01K 91/06 367/111 |
| 2008/0000138 | A1 * | 1/2008 | Cummings | A01K 97/125 43/25 |
| 2015/0113853 | A1 * | 4/2015 | McKeough | A01K 97/125 702/41 |
| 2017/0367104 | A1 * | 12/2017 | Raisoni | H04W 72/12 |
| 2018/0213761 | A1 * | 8/2018 | Carkner | G08B 5/22 |
| 2020/0113162 | A1 * | 4/2020 | Hamade | A01K 79/00 |

FOREIGN PATENT DOCUMENTS

| | | |
|---|---|---|
| JP | S62210936 A | 9/1987 |
| JP | 2005034116 A | 2/2005 |
| JP | 2013192542 A | 9/2013 |
| JP | 2017029051 A | 2/2017 |
| JP | 2018183102 A | 11/2018 |
| JP | 2019055728 A | 4/2019 |
| JP | 6634628 B1 | 1/2020 |

OTHER PUBLICATIONS

International Search Report for related International Application No. PCT/JP2021/033642; report dated May 5, 2022; (5 pages).
Written Opinion for related International Application No. PCT/JP2021/033642; report dated May 5, 2022; (5 pages).
May 29, 2024 Office Action issued in Chinese Patent Application No. 202180051769.4.
Feb. 28, 2024 Examination Report issued in Austrailian Patent Application No. 2021368309.
Examination Report in connection with UK Patent Application No. 2304239.3; action dated Sep. 8, 2023; (4 pages).
International Preliminary Report on Patentability for related International Application No. PCT/JP2021/033642; action dated May 2, 2023; (11 pages).
Nov. 28, 2023 Examination Report Issued in British Application No. 2304239.3.
Dec. 30, 2024 Office Action issued in Chinese Patent Application No. 202180051769.4.
Sep. 13, 2025 Office Action issued in Singaporean Patent Application No. 11202302147W.

* cited by examiner

FISHING CONDITION DETECTION AND TRANSMISSION DEVICE

CROSS-REFERENCE TO RELATED APPLICATIONS

The present application is a National Stage of International Application No. PCT/JP2021/033642 filed on Sep. 14, 2021 which claims priority to and the benefit of Japanese Patent Application No. 2020-179325 filed on Oct. 27, 2020, the contents of which are incorporated herein by reference in their entirety.

FIELD

The present disclosure relates to a fishing state detection/transmission device assumed to be provided on a fishing rod.

BACKGROUND

In the related art, various methods capable of detecting fish bite are known. In such a fishing rod, vibration of so-called fish bite is detected, and this is notified to the fishing person by using a notification means or an electronic device, for example, a luminous body or a buzzer.

Such a fishing rod is disclosed in, for example, Patent Literature 1. Patent Literature 1 discloses a fishing rod having a proximal end protection portion surrounding a proximal end portion of a fishing rod body, in which a cavity opened at a proximal end surface is formed inside the fishing rod body, a through hole penetrating the proximal end protection portion is formed in the proximal end protection portion; and when the proximal end portion of the fishing rod body is inserted into the through hole of the proximal end protection portion, and the cavity formed in the fishing rod body is in a state of being open to the outside in communication with the through hole at least while fishing is performed, amplification and sensitization are increased, and the vibration of the fish bite is clearly is felt by a fishing person gripping the fishing rod body since vibration of fish bite transmitted to a tip of the fishing rod via a fishing line is also transmitted to the cavity and transmitted through the opening when a fish is caught at the bottom of the water or in the water during use.

Furthermore, Patent Literature 2 discloses a detection device of fish bite in which a support rod of a fishing line support ring is provided on a lower front side of an attachment body formed to located at tip of a fishing rod; a pivot shaft portion having a support shaft extending in a horizontal direction is provided in the vicinity of a lower end of the support rod; the center portion of the fishing line support ring having a rotating contact on the upper portion is pivotably attached to the pivot shaft portion; a fixing contact is provided on a lower side of the front end of the attachment body; the fishing line support ring is inclined rearward all the time; when the fishing line passing through the fishing line support ring comes into contact with a lower half portion of the fishing line support ring, the fishing line support ring inclined rearward is rotated forward due to the contact to cause the rotating contact to come into contact with the fixing contact; and when the contact of the fishing line is released, the fishing line support ring is rotated to be inclined rearward such that the rotating contact is separated from the fixing contact, the detection device comprising a detection unit and a fishing line engaging portion, the detection unit being provided at a portion at which one electrode of the battery is connected to the rotating contact, the other electrode is connected to the fixing contact, and an electric alarm is inserted to the connecting line and the fishing line engaging portion being on the lower side near the tip of the fishing rod, being located on the rear side of the fishing line support ring, and engaging the fishing line.

CITATION LIST

Patent Literature

Patent Literature 1: Japanese Patent No. 6634628
Patent Literature 2: JP 2005-34116 A

SUMMARY

However, in the aspect according to patent Literature 1, although it is possible to amplify and transmit the vibration of the so-called fish bite, the fish bite just indicates a state in which a fish bites bait and the fish is caught on a fishing hook, and there is a problem that only the fish bite can be recognized and a state until the fish is hooked up after a fishing rig is thrown cannot be recognized. For example, it is known that, when a fish approaches the bait of the fishing rig, the fish comes into contact with the fishing line or the periphery of the fishing rig moves or vibrates due to the influence of water flow change or the like, and as a result, small deformation and vibration is transmitted to the fishing rod via the fishing line to which the bait is attached.

Furthermore, even in the aspect according to patent Literature 2, although it is possible to perform detection of subtle fish bite, there is a problem that only the fish bite can be recognized and a state until the fish is hooked up after a fishing rig is thrown is difficult to recognize.

In order to further improve the fishing results, it is not sufficient to simply detect the vibration of the fish bite in the first place, and it is essential to accurately and reliably recognize states of the fish and fishing line from when a fishing rig is thrown and bait lands on the bottom until the fish bite and a state of winding up after the fish bite (hereinafter, collectively referred to as fishing state). However, such a fishing state cannot be detected and transmitted in addition to the aspect according to Patent Literature 1. Note that such a transmission device (bite alarm) is based on the premise that a rod is placed (not moved) on a fishing seat and a placing rod is placed, and it is not assumed that a fishing rod is mainly used in a gripped state (holding rod) (it can also be used as a placing rod).

The present disclosure has been made in view of the above-described circumstances, and an object of the present disclosure is to provide a fishing state detection/transmission device that can be provided on a fishing rod, can accurately and reliably detect the above-described fishing state, and can transmit the detected fishing state to a fishing person. Purposes of the present disclosure other than this object will be clarified by referring to the overall description disclosed herein.

There is provided a fishing state detection/transmission device according to an embodiment of the present disclosure that comprises a grip portion and is provided on a fishing rod to which a fishing line having a fishing hook is attached at an end, the fishing state detection/transmission device comprising: a vibration generation unit that is provided on the grip portion and generates vibration in the grip portion; a first detection unit that is provided on the fishing rod, and detects movement or vibration of the fishing rod to generate first time-series data; and an information processing unit that transmits a vibration generation signal to the vibration generation unit on a basis of the first time-series data.

In the fishing state detection/transmission device according to the embodiment of the present disclosure, the vibration generation unit comprises an actuator unit that vibrates the grip portion and drives the actuator unit on the basis of the vibration generation signal from the information processing unit. Furthermore, in the fishing state detection/transmission device according to the embodiment of the present disclosure, the actuator unit is a plate-shaped actuator.

In the fishing state detection/transmission device according to the embodiment of the present disclosure, the vibration generation unit generates first vibration in a case where the first time-series data indicates that a fish is approaching the fishing hook. Furthermore, in the fishing state detection/transmission device according to the embodiment of the present disclosure, the vibration generation unit generates second vibration in a case where the first time-series data indicates that the fishing rod is luring fishes. Furthermore, in the fishing state detection/transmission device according to the embodiment of the present disclosure, the vibration generation unit generates third vibration in a case where the first time-series data indicates fish bite to the fishing hook.

In the fishing state detection/transmission device according to the embodiment of the present disclosure, the first detection unit is provided at a position at which deformation and vibration of the fishing rod are capable of being detected. Furthermore, in the fishing state detection/transmission device according to the embodiment of the present disclosure, the first detection unit is provided at a position at which curvature variation of the fishing rod is great. Furthermore, the fishing state detection/transmission device according to the embodiment of the present disclosure further comprises a second detection unit that is provided on the grip portion, detects movement made by an operation of the fishing rod, and generates second time-series data, in which the information processing unit transmits a vibration generation signal to the vibration generation unit on the basis of the first time-series data and the second time-series data.

The fishing state detection/transmission device according to the embodiment of the present disclosure further comprises a transmission unit, in which at least one of the second time-series data detected by the second detection unit, the third time-series data detected by the fishing line/fishing line length change detection unit or the fourth time-series data detected by the fishing line/fishing line length change detection unit is transmitted to an outside.

The fishing state detection/transmission device according to the embodiment of the present disclosure further comprises a transmission unit, in which the first time-series data detected by the first detection unit is transmitted to an outside.

The fishing state detection/transmission device according to the embodiment of the present disclosure further comprises a fishing line/fishing line length change detection unit that is provided on the fishing rod, detects a length of the fishing line to generate third time-series data, and detects change in fishing line length to generate fourth time-series data, in which in a case where the third time-series data and the fourth time-series data satisfy a predetermined condition, the information processing unit does not transmit a vibration generation signal to the vibration generation unit.

The fishing state detection/transmission device according to the embodiment of the present disclosure further comprises a reception unit, in which data regarding a fishing condition is received from the outside, and the information processing unit transmits a vibration generation signal to the vibration generation unit also with reference to the data. Furthermore, there is provided a fishing rod according to the embodiment of the present disclosure comprising any one of the above-described fishing state detection/transmission devices.

According to the embodiment, it can be provided a fishing state detection/transmission device that is capable of being provided on a fishing rod, detecting the fishing state accurately and reliably, and transmitting the fishing state to the fishing person.

DETAILED DESCRIPTION

Hereinafter, an embodiment of a fishing rod according to the present disclosure will be specifically described with reference to the accompanying drawings. Components common to a plurality of drawings are denoted by the same reference numerals throughout a plurality of the drawings. Note that the drawings are not necessarily drawn to scale for convenience of description.

Figure 1:
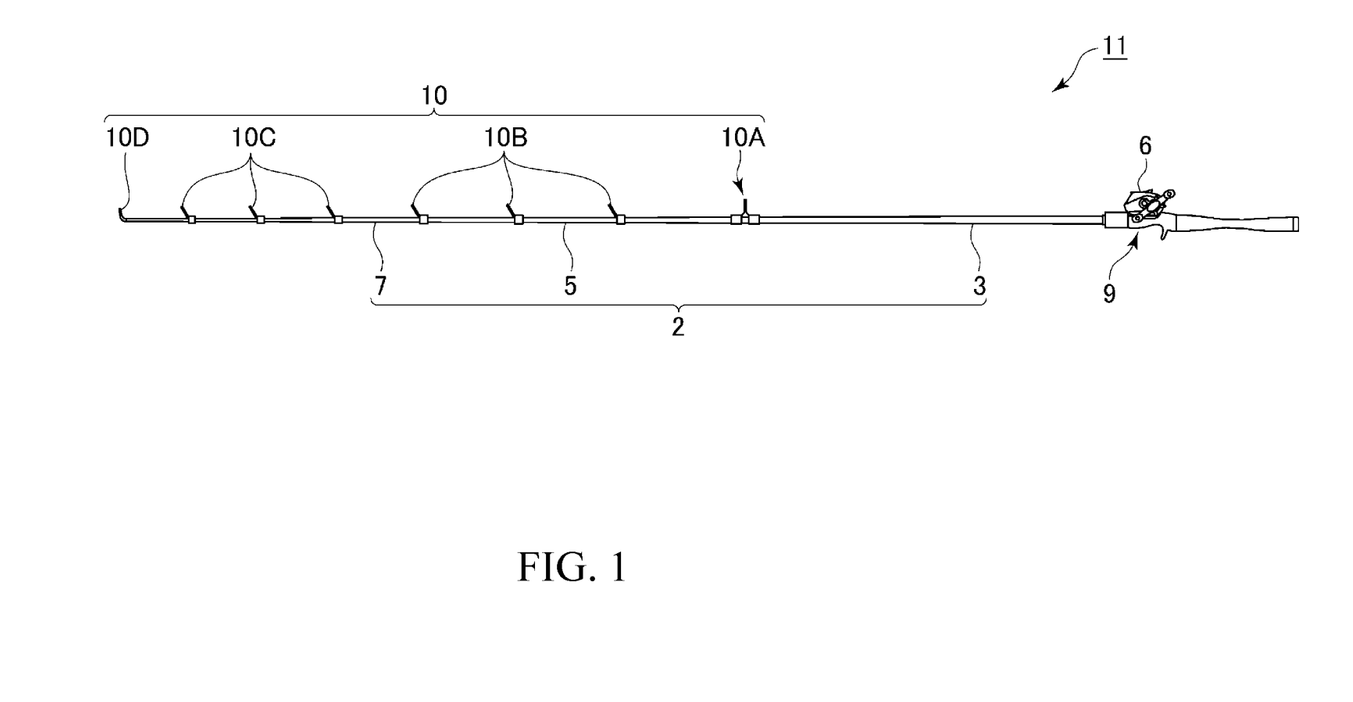
FIG. 1 is a view illustrating a fishing rod according to an embodiment of the present disclosure.

FIG. 1 is a view illustrating the fishing rod. As illustrated in the drawings, a fishing rod 11 comprises a rod body 2, a reel 6 attached to the rod body 2 via the fishing rod 11, and a fishing line guide 10 attached to the rod body 2. In the illustrated embodiment, the fishing rod 11 and the fishing line guides 10 correspond to attachment components attached to an outer peripheral surface of the rod body.

The rod body 2 is constituted by, for example, connecting a base rod 3, a middle rod 5, a tip rod 7, and the like to each other. These rod bodies are joined to each other, for example, as an ordinarily jointed type. The base rod 3, the middle rod 5, and the tip rod 7 can be joined to each other as a telescopic type, an inversely jointed type, a socket-and-spigot jointed type, or any other known joining type. The rod body 2 may be formed by a single rod body.

The base rod 3, the middle rod 5, and the tip rod 7 are each formed by, for example, a tubular body made of a fiber-reinforced resin. This tubular body made of a fiber-reinforced resin is formed by winding a fiber-reinforced resin prepreg (prepreg sheet) in which reinforcing fibers are impregnated with a matrix resin around a core metal, and heating and curing the prepreg sheet. As the reinforcing fibers contained in the prepreg sheet, for example, carbon fibers, glass fibers, and any other known reinforcing fibers can be used. As the matrix resin contained in the prepreg sheet, a thermosetting resin such as an epoxy resin can be used. After the prepreg sheet is cured, the core metal is removed. Furthermore, an outer surface of the tubular body is appropriately polished. Each of the rod bodies may be formed in a solid state.

In the illustrated embodiment, the base rod 3, the middle rod 5, and the tip rod 7 comprises a plurality of fishing line guides 10 (fishing line guides 10A to 10D) for guiding a fishing line fed from the reel 6 attached to the fishing rod 11. More specifically, the base rod 3 comprises the fishing line guide 10A, the middle rod 5 comprises the fishing line guide 10B, and the tip rod 7 comprises the fishing line guide 10C. The tip rod 7 comprises the top guide 10D at a tip thereof, but details thereof are omitted.

Figure 5:
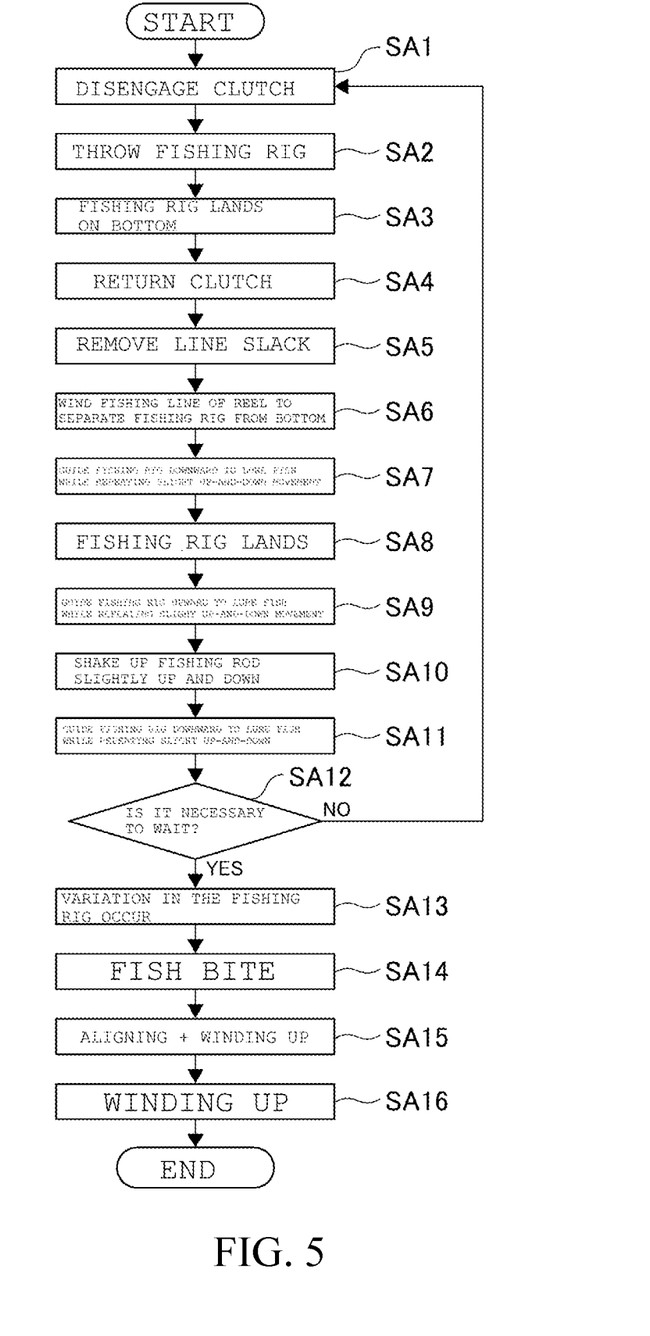
FIG. 5 is a flowchart illustrating a procedure of bait fishing using a bait reel.

Next, a procedure of bait fishing using a bait reel is illustrated with reference to FIG. 5. Note that a spinning reel can be used, but for convenience of description, the description will be made on the premise of the bait reel. First, as preparation, a reel is set on the fishing rod, a fishing line passes through guides, a fishing rig is attached, a bait is put on a fishing hook, and a tip of the fishing rod is taken out to the seaside (including the case of a river, a pond, or the like) (not illustrated).

Next, a fishing operation is started. As illustrated in the drawing, first, as a setting procedure, a clutch is disengaged (SA1), the fishing rig is thrown (SA2), the fishing rig lands on the bottom (SA3), the clutch is returned (SA4), and line slack is removed (SA5). Next, the fishing line of the reel is wound to cause the fishing rig to be separated from the bottom (SA6) and the fishing rig is guided downward to lure the fish while repeating slight up-and-down movement (SA7). Various patterns are conceivable in this procedure, and the illustrated example is merely an example thereof. Next, after the fishing rig lands on the bottom (SA8), the fishing rig is guided upward to lure the fish while repeating slight up-and-down movement (SA9), the fishing rod is slightly shaken up and down (SA10), and the fishing rig is guided downward to lure the fish while repeating slight up-and-down movement (SA11).

Thereafter, waiting is performed for a predetermined time (SA12), and the processing is returned to the first step depending on the case. When variation in the fishing rig occurs (SA13) and the fish bite is felt (SA14), the fishing line is aligned to be wound up (SA15), and finally wound up (SA16). In this way, the caught fish can be collected.

Figure 6:
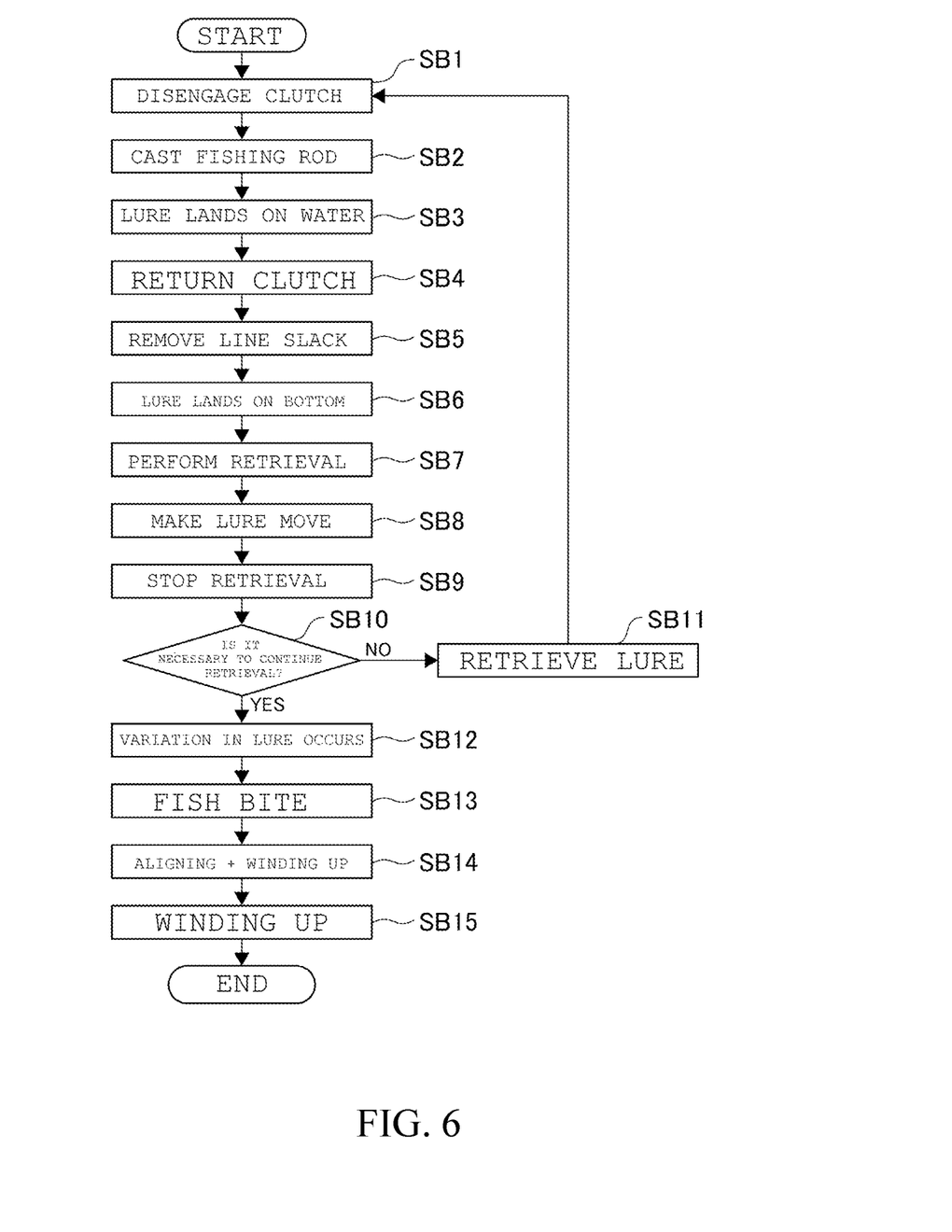
FIG. 6 is a flowchart illustrating a procedure of lure fishing using a bait reel.

Next, a procedure of lure fishing using the bait reel is illustrated with reference to FIG. 6. Note that a spinning reel can be used, but for convenience of description, the description will be made on the premise of the bait reel. First, as preparation, a reel is set on the fishing rod, a fishing line passes through guides, and a lure is attached (not illustrated).

Next, a fishing operation is started. As illustrated in the drawing, first, as a setting procedure, a clutch is disengaged (SB1), the fishing rod is cast (SB2), the lure lands on the water (SB3), the clutch is returned (SB4), and line slack is removed (SB5). Next, the lure is landed on the bottom (SB6). Thereafter, retrieval is performed (SB7), the lure is made move (SB8), the retrieval is stopped (SB9), and the retrieval is further performed (SB10). Various patterns are conceivable in this procedure, and the illustrated example is merely an example thereof. Optionally, the lure is retrieved (SB11), and the processing is returned to the first step.

Thereafter, when variation in the lure occurs (SB12) and the fish bite is felt (SA13), the fishing line is aligned to be wound up (SA14), and finally wound up (SA15). In this way, the caught fish can be collected.

Figure 2:
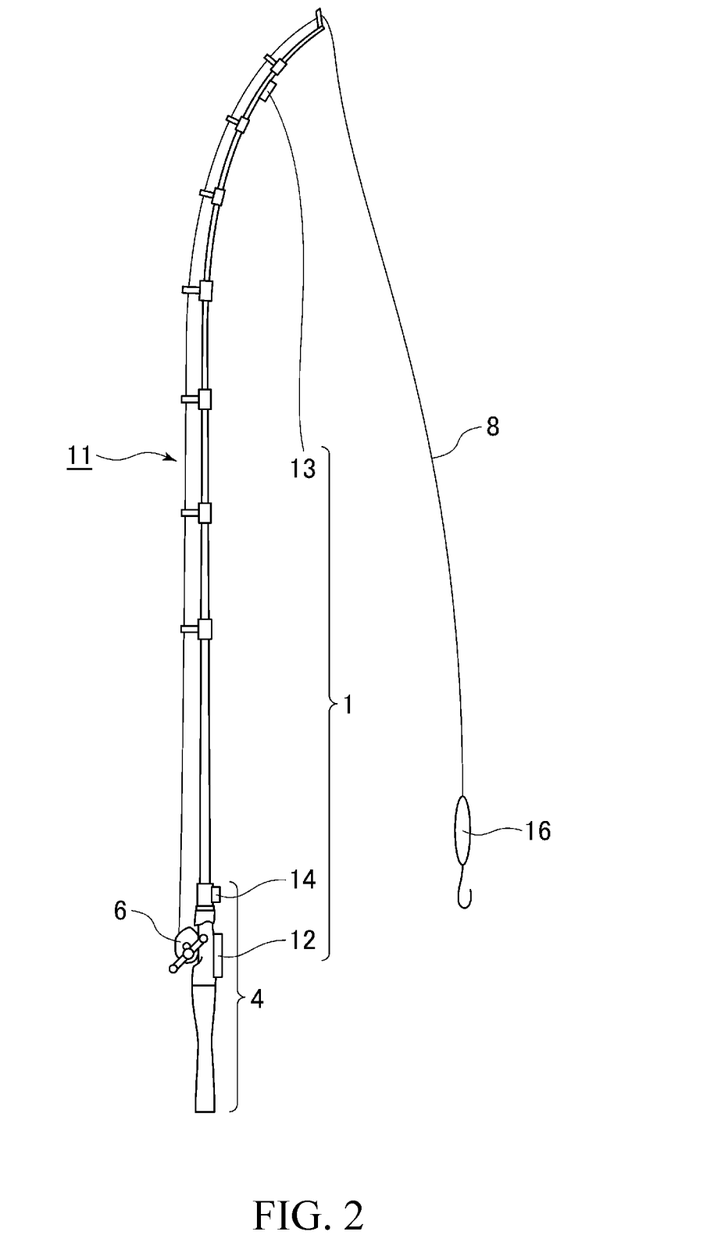
FIG. 2 is a view illustrating a fishing state detection/transmission device according to the embodiment of the present disclosure.

Next, the fishing state detection/transmission device according to the embodiment of the present disclosure is described with reference to FIG. 2. As illustrated in the drawing, a fishing state detection/transmission device 1 according to the embodiment of the present disclosure comprises a grip portion 4 and is provided on the fishing rod 11 to which a fishing line 8 having a fishing hook 16 is attached at an end, the fishing state detection/transmission device 1 comprising: a vibration generation unit 12 that is provided on the grip portion 4 and generates vibration in the grip portion 4; a first detection unit 13 that is provided on the fishing rod and detects movement or vibration of the fishing rod to generate first time-series data; and an information processing unit 14 that transmits a vibration generation signal to the vibration generation unit 12 on the basis of the first time-series data. As the first detection unit 13, a piezoelectric element, a strain gauge, or a strain detection element can be used, but the present disclosure is not limited thereto. Here, the movement and vibration of the fishing rod can be faithfully realized by the vibration generation unit 12. Furthermore, the movement and vibration of the fishing rod may be amplified and generated by the vibration generation unit 12. Alternatively, the movement and vibration of the fishing rod may be generated by adjusting the transmission strength in the vibration generation unit 12. Note that in addition to the fishing hook 16, a lure, a fish-luring member (for example, a chum basket, a fish-luring plate, or the like), and the like can be attached to the fishing line 8 (not limited thereto), and these are collectively referred to as a fishing hook and the like.

The fishing state detection/transmission device 1 according to the embodiment of the present disclosure can be provided on the fishing rod, detect the fishing state accurately and reliably, and transmit the fishing state to the fishing person. Accordingly, the fishing person can precisely recognize the state of the fishing line or fishing hook before the fish bite and the state of the fishing line or fishing hook after the fish bite, and thus a fish-catch result can be significantly improved and the interest in the fishing can be increased regardless of the fishing person's skill. Furthermore, since there is no reaction from the vibration generation unit when the bait is taken, it is possible to more easily determine whether or not the bait remains, and it is also possible to maintain concentration.

Here, in the case of the fishing rod 11 to which the fishing line having the fishing hook 16 is attached at the end, the end thereof may not be an end in a strict sense depending on the type of fishing rig (rig). For example, the end of the fishing line may be provided with a fishing rig, a lure, or other members, and these may be provided with the fishing hook 16, or various modes are conceivable in which the fishing line itself comprises a plurality of fishing lines and another intermediate member is attached to a plurality of the fishing lines and between a plurality of the fishing lines. From the above, in a case where there may be a configuration made by one fishing line, a plurality of the fishing lines, or a plurality of the fishing lines and the intermediate member provided between a plurality of the fishing lines, and the fishing hook is provided at the end of the fishing line, it should be understood that it means that the fishing hook is provided at the end of the fishing line directly or via the intermediate member (the rig, the lure, or the like is assumed, but the present disclosure is not limited thereto).

In the fishing state detection/transmission device 1 according to the embodiment of the present disclosure, the vibration generation unit 12 comprises an actuator unit that vibrates the grip portion 4, and is configured to drive the actuator unit on the basis of a vibration generation signal from the information processing unit 14. Here, furthermore, in the fishing state detection/transmission device according to the embodiment of the present disclosure, the actuator unit is configured to be a plate-shaped actuator. The reason why the plate-shaped actuator is desirable is that, first, the vibration waveform of the vibration generation unit 12 is optimal for assimilating with the real sense of fishing of the fishing person (deformation form of the plate is the same as the deformation form of the fishing rod, and it is felt that the deformation and vibration of the tip are at hand), and then, vibration of a low frequency (1 Hz or higher) can also be felt by physical deformation.

Figure 3:
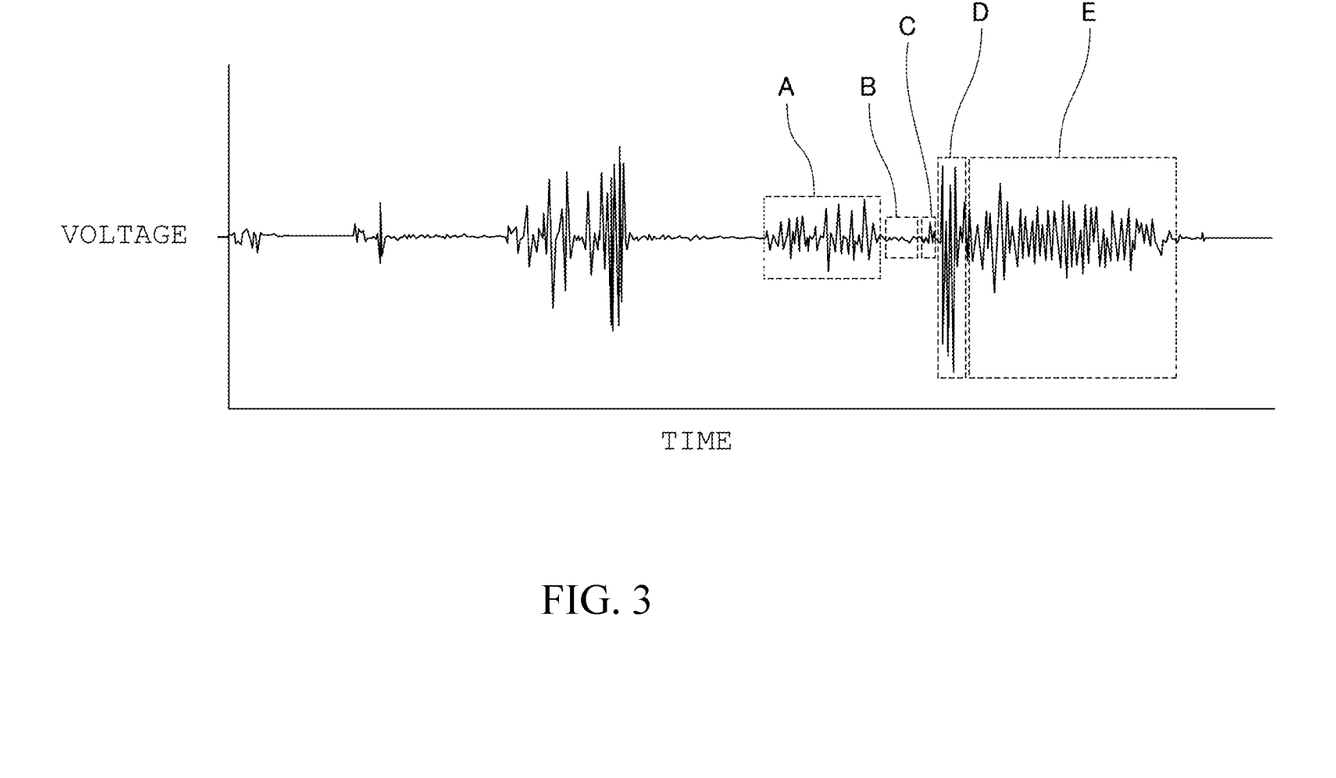
FIG. 3 is a diagram illustrating time-series data in a fishing state detection/transmission device according to the embodiment of the present disclosure.

Next, the first time-series data in the fishing state detection/transmission device 1 according to the embodiment of the present disclosure is described with reference to FIG. 3. In FIG. 3, the horizontal axis represents a time, and the vertical axis represents a voltage. In the illustrated example, the first detection unit 13 detects the movement and vibration of the fishing rod until a filefish as an example is caught after the start of fishing.

For example, in the fishing state detection/transmission device 1 according to the embodiment of the present disclosure, when the first detection unit 13 detects A of the illustrated first time-series data, it is determined from the nature of the waveform that the luring operation with the fishing rod is being performed, and thus the vibration generation unit generates first vibration indicating that the luring operation with the fishing rod is being performed.

Furthermore, for example, in the fishing state detection/transmission device 1 according to the embodiment of the present disclosure, when the first detection unit 13 detects B of the illustrated first time-series data, it is determined from the nature of the waveform that the fish is approaching the fishing hook (referred to as pre-fish bite), and thus the vibration generation unit generates second vibration indicating that the fish is approaching the fishing hook.

Next, for example, in the fishing state detection/transmission device 1 according to the embodiment of the present disclosure, when the first detection unit 13 detects C of the illustrated first time-series data, it is determined from the nature of the waveform that C indicate the fish bite to the fishing hook, and thus the vibration generation unit generates third vibration indicating the fish bite to the fishing hook.

Furthermore, for example, in the fishing state detection/transmission device 1 according to the embodiment of the present disclosure, when the first detection unit 13 detects D of the illustrated first time-series data, it is determined from the nature of the waveform that the fishing line is aligned and is being wound up, and thus the vibration generation unit generates fourth vibration indicating that the fishing line is aligned and is being wound up.

Next, for example, in the fishing state detection/transmission device 1 according to the embodiment of the present disclosure, when the first detection unit 13 detects E of the illustrated first time-series data, it is determined from the nature of the waveform that the fishing line is being wound up, and thus the vibration generation unit generates fifth vibration indicating that the fishing line is being wound up.

In the fishing state detection/transmission device 1 according to the embodiment of the present disclosure, the first detection unit is configured to be provided at a position at which deformation and vibration of the fishing rod can be detected. For example, in the fishing state detection/transmission device 1 according to the embodiment of the present disclosure, the first detection unit is configured to be provided at a position at which the curvature variation of the fishing rod is great. In this manner, it is possible to more accurately detect slight deformation and slight vibration of the fishing rod.

Here, at the position at which the curvature variation of the fishing rod is great, the fishing rod bends when a load is applied to the rod tip of the fishing rod. At this time, when the fishing rod is locally observed, the bend of each portion can be expressed by k (curvature). The k (curvature) varies in synchronization with the load when the load is changed. In the fishing rod, the position at which the variation of k is great is defined as a position at which the curvature variation of the fishing rod is great.

Figure 7:
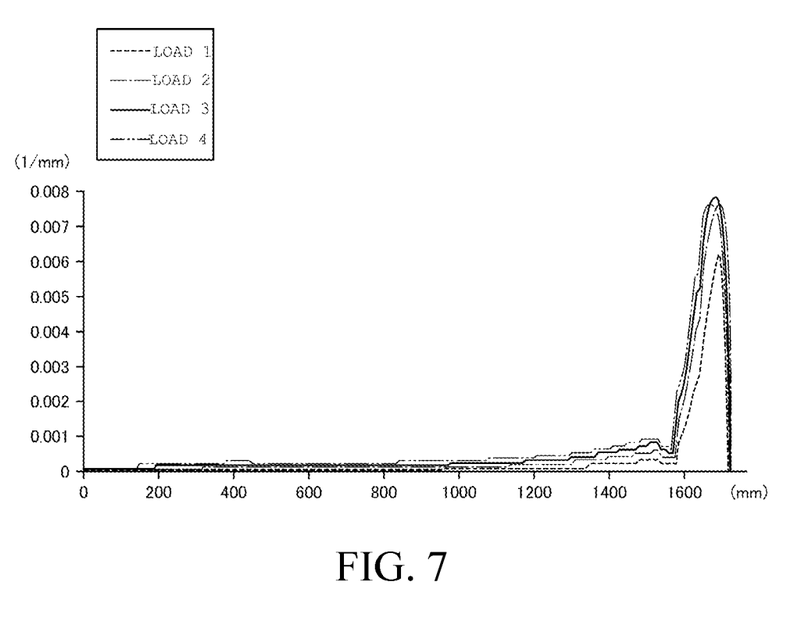
FIG. 7 is a diagram illustrating a position at which curvature variation of a fishing rod is great in the fishing rod according to the embodiment of the present disclosure.

Here, FIG. 7 illustrates k (curvature) at each position from the rod base to the rod tip of the fishing rod. Furthermore, it also illustrates that the curvature varies according to the load applied to the fishing line. With reference to FIG. 7, it can be seen that k (curvature) does not vary so much from the rod base to a position of about 1200 mm, the curvature variation becomes great from the position, and the maximum curvature value is obtained at a position in front of the rod tip. Furthermore, it can be seen that the curvature variation increases until the curvature value reaches the maximum value from a position of 1200 mm when the load change. Note that the illustrated example is merely an example, and the curvature varies depending on the state of the fishing rod, an angle at which the fishing rod is used, or the load applied to the fishing rod. As described above, the first detection unit is configured to be provided at a position at which the curvature variation of the fishing rod is great, and thus it is possible to more accurately detect slight deformation and slight vibration of the fishing rod.

Figure 4:
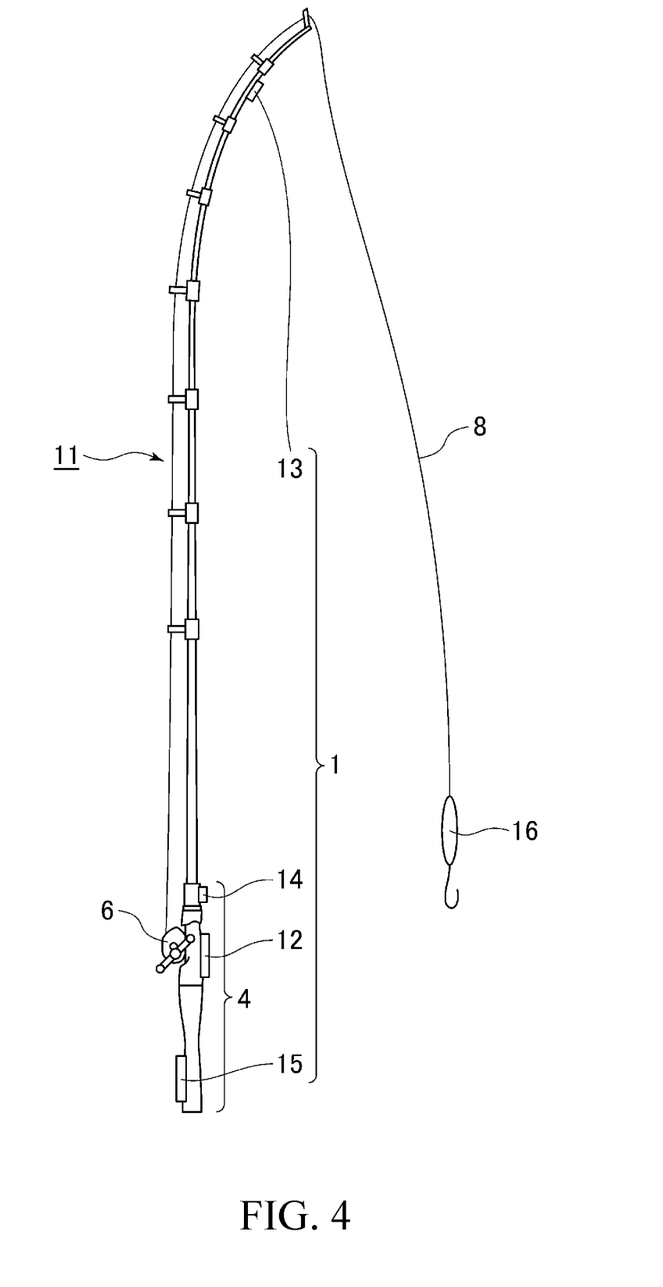
FIG. 4 is a view illustrating a fishing state detection/transmission device according to the embodiment of the present disclosure.

Next, the fishing state detection/transmission device according to the embodiment of the present disclosure is described with reference to FIG. 4. The fishing state detection/transmission device 1 according to the embodiment of the present disclosure further comprises a second detection unit 15 that is provided on the grip portion 4, detects movement made by an operation of the fishing rod 11, and generates second time-series data, and the information processing unit 14 is configured to transmit a vibration generation signal to the vibration generation unit 12 on the basis of the first time-series data and the second time-series data. In this manner, since the determination is performed including information regarding the operation of the fishing rod through the manipulation of the fishing rod 11, more correct and accurate determination can be performed. For example, in a case where the fishing rod is unintentionally manipulated, it may be beneficial to detect the operation of the fishing rod 11 through the manipulation of the fishing rod 11.

Next, the fishing state detection/transmission device 1 according to the embodiment of the present disclosure comprises a fishing line/fishing line length change detection unit (not illustrated) that is provided on the fishing rod 11, detects the length of the fishing rod 11 to generate third time-series data, and detects vibration in fishing line length to generate fourth time-series data. In a case where the third time-series data and the fourth time-series data satisfy a predetermined condition, the information processing unit 14 does not transmit a vibration generation signal to the vibration generation unit 12. In this manner, the length of the fishing line and the fishing line change is confirmed, and thus generation of noise and unnecessary vibration can be prevented. For example, there is a case where vibration is generated when a weight lands on the bottom, but in a case where this is unnecessary vibration, it is possible not to transmit the vibration generation signal.

The fishing rod 11 according to the embodiment of the present disclosure comprises any one of the above-described fishing state detection/transmission devices 1. The fishing rod 11 according to the embodiment of the present disclosure can detect the fishing state accurately and reliably, and transmit the fishing state to the fishing person. Accordingly, the fishing person can precisely recognize the state of the fishing line or fishing hook before the fish bite and the state of the fishing line or fishing hook after the fish bite, and thus a fish-catch result can be significantly improved and the interest in the fishing can be increased regardless of the fishing person's skill.

The fishing state detection/transmission device according to the embodiment of the present disclosure further comprises a transmission unit, in which at least one of the second time-series data detected by the second detection unit, the third time-series data detected by the fishing line/fishing line length change detection unit or the fourth time-series data detected by the fishing line/fishing line length change detection unit is transmitted to an outside. Therefore, it is possible to adjust amplification conditions of the vibration generation unit 12, record and notify the time-series data A to E, and perform processing of detecting a fishing state caused by a time-series change in an occurrence state. Here, examples of the outside include an external information communication terminal (for example, a smartphone or the like), an information processing apparatus, and an information processing system, but are not limited thereto.

The fishing state detection/transmission device according to the embodiment of the present disclosure further comprises a transmission unit, in which the first time-series data detected by the first detection unit is transmitted to an outside. Here, examples of the outside include an external information communication terminal (for example, a smartphone or the like), an information processing apparatus, and an information processing system, but are not limited thereto. Note that the transmission mode is not limited to the smartphone or the like.

Figure 8:
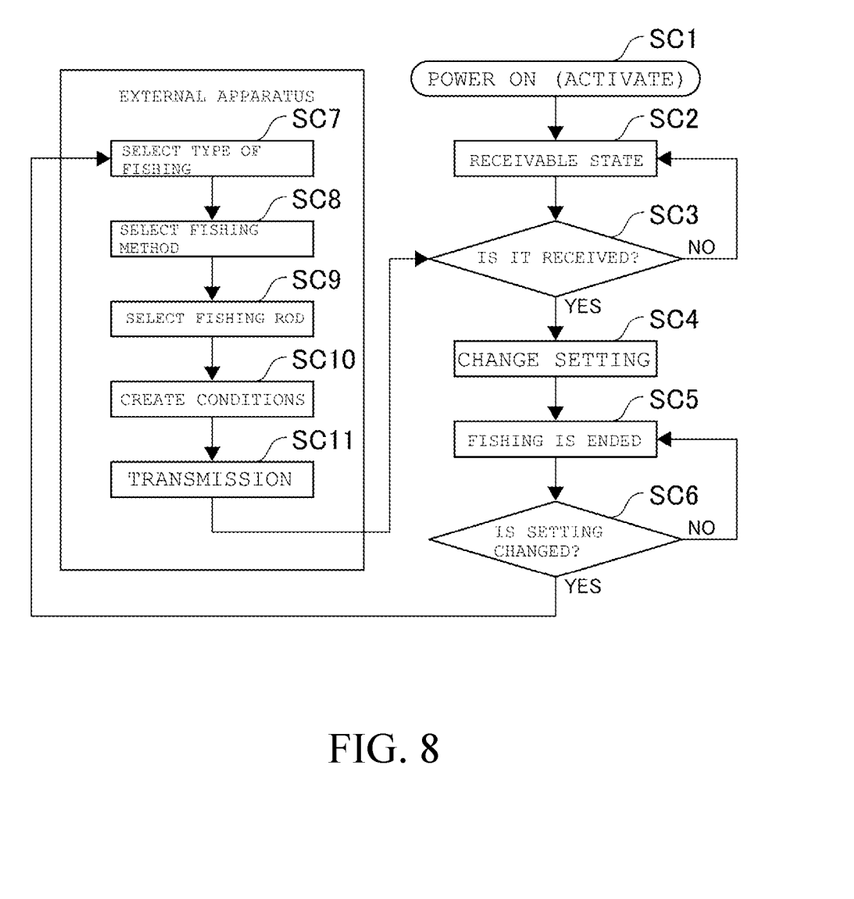
FIG. 8 is a flowchart illustrating transmission and reception to and from the outside in a fishing state detection/transmission device according to the embodiment of the present disclosure.

Next, an example of the case where the fishing state detection/transmission device according to the embodiment of the present disclosure performs transmission and reception with the outside will be described with reference to FIG. 8. As illustrated in the drawing, first, the fishing state detection/transmission device is powered on and activated (SC1). Thereafter, it enters a receivable state (SC2). It is confirmed whether or not a request has been received from the outside (SC3), and in a case where the request has not been received, the processing returns to the previous step (SC2). In a case where a request (such as a setting change) is received from the outside, a necessary setting change is performed according to the request (SC4). For example, according to this, a vibration detection method, an output amplification method, and the like can be considered, but the present disclosure is not limited thereto. Thereafter, it is confirmed whether the fishing by the fishing person is started and the fishing is ended (SC5), and then it is further confirmed whether to change the setting. In a case where the setting is changed, the request is transmitted to the outside (SC6).

When the outside (apparatus) receives the request, the outside first selects the type of fishing (SC7). Next, a fishing method is selected (SC8). Next, the type of fishing rod is selected (SC9). Then, a condition is created on the basis of these selected types and methods (SC10). Thereafter, a change request is made from the outside (apparatus) to the fishing state detection/transmission device (SC11), and the processing returns to confirmation processing as to whether or not the change request is received from the outside (SC3). In this manner, the fishing state detection/transmission device and the outside (apparatus) can be linked, and the vibration detection method and the output amplification method can be easily and reliably changed using the outside (apparatus).

Figure 9:
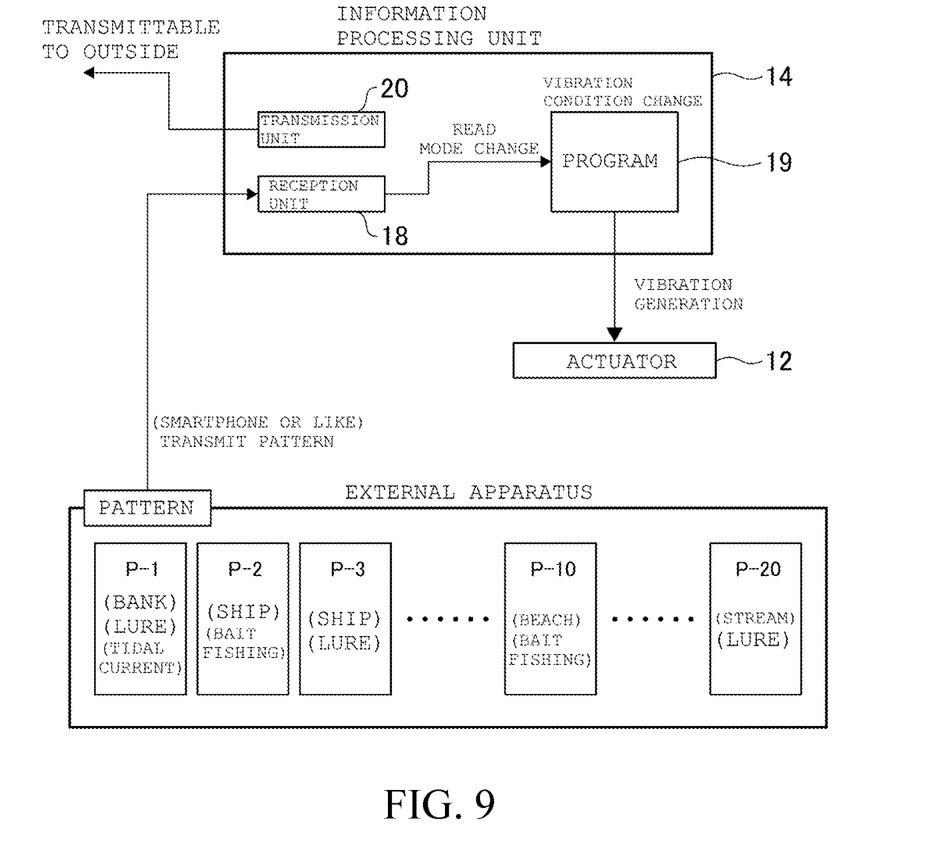
FIG. 9 is a diagram illustrating reception of a fishing condition (pattern) from the outside in a fishing state detection/transmission device according to the embodiment of the present disclosure.

Next, an example of the case where the fishing state detection/transmission device according to the embodiment of the present disclosure receives the fishing condition (pattern) from the outside will be described with reference to FIG. 9. As illustrated in the drawing, the information processing unit 14 of the fishing state detection/transmission device according to the embodiment of the present disclosure comprises a reception unit 18, and can receive the fishing condition (pattern) from the outside (apparatus). Examples of the fishing condition (pattern) include P-1, P-2, P-3, • • •, P-10, • • •, and P-20 in the illustrated example. Each fishing condition includes conditions such as a fishing place and a fishing type.

When receiving the fishing condition (pattern), the information processing unit 14 of the fishing state detection/transmission device according to the embodiment of the present disclosure changes a vibration condition read by a program (processing unit) 19, and then transmits, to an actuator (vibration generation unit) 12, the vibration condition to which the received fishing condition is applied. In this manner, since it is possible to generate vibration suitable for each fishing pattern, it is possible to more accurately and reliably detect the fishing state and transmit the detected fishing state to the fishing person. Therefore, the fishing person can more precisely recognize the state of the entire fishing, and thus a fish-catch result can be significantly improved and the interest in the fishing can be increased regardless of the fishing person's skill.

Furthermore, as illustrated in the drawing, the information processing unit 14 of the fishing state detection/transmission device according to the embodiment of the present disclosure comprises a transmission unit 20, and can transmit setting information such as a vibration condition in the actuator (vibration generation unit) 12 to the outside (apparatus) as necessary. Accordingly, the latest setting information can be confirmed by the outside (apparatus), and as necessary, a request for changing the setting information can be transmitted from the outside (apparatus) to the fishing state detection/transmission device. In this manner, the fishing state detection/transmission device and the outside (apparatus) can be linked, and the setting information such as the vibration condition can be easily and reliably changed using the outside (apparatus).

Dimensions, materials, and arrangements of the components described in this specification are not limited to those explicitly described in the embodiment, and the components may be modified to have any dimensions, materials, and arrangements that may fall within the scope of the present disclosure. Furthermore, components not explicitly described herein can be added to the described embodiments, or some of the components described in each embodiment can be omitted.

REFERENCE SIGNS LIST

1 Fishing state detection/transmission device
2 Rod body
3 Base rod
4 Grip portion
5 Middle rod
6 Reel
7 Tip rod
8 Fishing line
10 Fishing line guide
11 Fishing rod
12 Vibration generation unit
13 First detection unit
14 Information processing unit
15 Second detection unit
16 Fishing hook
18 Reception unit
19 Program (processing unit)
20 Transmission unit

The invention claimed is:

1. A fishing state detection/transmission device that comprises a grip portion and is provided on a fishing rod to which a fishing line having a fishing hook is attached at an end, the fishing state detection/transmission device comprising:
a vibration generation unit that is provided on the grip portion and generates vibration in the grip portion;
a first detection unit that is provided on the fishing rod, and detects movement or vibration of the fishing rod to generate first time-series data;
an information processing unit that transmits a vibration generation signal to the vibration generation unit on a basis of the first time-series data; and
a fishing line detection unit that (i) is provided on the fishing rod, (ii) detects a length of the fishing line to generate third time-series data, and (iii) detects change in fishing line length to generate fourth time-series data, wherein
in a case where the third time-series data and the fourth time-series data satisfy a predetermined condition, the information processing unit prevents transmission of the vibration generation signal to the vibration generation unit.

2. The fishing state detection/transmission device according to claim 1, wherein the vibration generation unit comprises an actuator unit that vibrates the grip portion, and drives the actuator unit on a basis of the vibration generation signal from the information processing unit.

3. The fishing state detection/transmission device according to claim 2, wherein the actuator unit is a plate-shaped actuator.

4. The fishing state detection/transmission device according to claim 1, wherein
the information processing unit is configured to analyze patterns in the first time-series data, and
the vibration generation unit generates a first vibration in a case where the patterns in the first time-series data indicate that a fish is approaching the fishing hook.

5. The fishing state detection/transmission device according to claim 1, wherein
the information processing unit is configured to analyze patterns in the first time-series data, and
the vibration generation unit generates a second vibration in a case where the patterns in the first time-series data indicate that the fishing rod is luring fish.

6. The fishing state detection/transmission device according to claim 1, wherein the vibration generation unit generates a third vibration in a case where the first time-series data indicates fish bite to the fishing hook.

7. The fishing state detection/transmission device according to claim 1, wherein the first detection unit is provided at a position at which deformation and vibration of the fishing rod are capable of being detected.

8. The fishing state detection/transmission device according to claim 1, wherein the first detection unit is provided at a position at which curvature variation of the fishing rod is greater than another position when a load is applied to the fishing rod.

9. The fishing state detection/transmission device according to claim 1, further comprising a second detection unit that is provided on the grip portion, detects movement made by an operation of the fishing rod, and generates second time-series data, wherein the information processing unit transmits the vibration generation signal to the vibration generation unit on a basis of the first time-series data and the second time-series data.

10. The fishing state detection/transmission device according to claim 9, further comprising a transmission unit, wherein at least one of the second time-series data detected by the second detection unit, the third time-series data detected by the fishing line detection unit or the fourth time-series data detected by the fishing line detection unit is transmitted externally from the fishing state detection/transmission device by the transmission unit.

11. The fishing state detection/transmission device according to claim 1, further comprising a transmission unit, wherein the first time-series data detected by the first detection unit is transmitted externally from the fishing state detection/transmission device by the transmission unit.

12. The fishing state detection/transmission device according to claim 1, further comprising a reception unit, wherein data regarding a fishing condition is received from an external source, and the information processing unit transmits the vibration generation signal to the vibration generation unit with reference to the data.

13. A fishing rod comprising the fishing state detection/transmission device according to claim 1.

* * * * *